US012766864B2

(12) United States Patent
Kawakami et al.

(10) Patent No.: US 12,766,864 B2
(45) Date of Patent: Oct. 20, 2026

(54) INKJET RECORDING APPARATUS AND RECORDING MEDIUM

(71) Applicant: Konica Minolta, Inc., Tokyo (JP)

(72) Inventors: Hajime Kawakami, Hino (JP); Keishi Suzuki, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 134 days.

(21) Appl. No.: 18/792,155

(22) Filed: Aug. 1, 2024

(65) Prior Publication Data

US 2025/0050664 A1 Feb. 13, 2025

(30) Foreign Application Priority Data

Aug. 7, 2023 (JP) ................................ 2023-128611

(51) Int. Cl.

| | |
|---|---|
| ***B41J 29/17*** | (2006.01) |
| ***B41J 3/407*** | (2006.01) |
| ***B41J 15/04*** | (2006.01) |
| ***B41J 29/46*** | (2006.01) |
| ***B65G 45/18*** | (2006.01) |
| ***C09D 11/107*** | (2014.01) |
| ***C09D 11/322*** | (2014.01) |

(52) U.S. Cl.

CPC ............ *B41J 29/17* (2013.01); *B41J 3/4078* (2013.01); *B41J 15/048* (2013.01); *B41J 29/46* (2013.01); *B65G 45/18* (2013.01); *C09D 11/107* (2013.01); *C09D 11/322* (2013.01)

(58) Field of Classification Search

CPC ........ B41J 29/17; B41J 3/4078; B41J 15/048; B41J 29/46; B41J 11/007; B41J 29/38; B65G 45/18; C09D 11/107; C09D 11/322

See application file for complete search history.

(56) References Cited

U.S. PATENT DOCUMENTS

2022/0243392 A1* 8/2022 Yamada ................ B41J 3/4078
2023/0057854 A1* 2/2023 Yumoto ................ B41J 15/048

FOREIGN PATENT DOCUMENTS

JP 2014-185028 A 10/2014

* cited by examiner

*Primary Examiner* — Jannelle M Lebron
(74) *Attorney, Agent, or Firm* — LUCAS & MERCANTI, LLP

(57) ABSTRACT

An inkjet recording apparatus includes a hardware processor that controls a conveyance operation of a conveyance member that conveys a recording medium, a head unit that forms an image by ejecting an ink containing a binder resin onto the recording medium on the conveyance member, and a cleaner that cleans the conveyance member, in which the hardware processor, when instructed to stop the conveyance operation of the conveyance member, executes a cleaning mode in which conveyance of the conveyance member is continued to cause the cleaner to clean the conveyance member, or stops conveyance of the conveyance member to provide an alert that there is a possibility that foreign matter is adhering to the conveyance member.

16 Claims, 6 Drawing Sheets

INKJET RECORDING APPARATUS AND RECORDING MEDIUM

CROSS-REFERENCE TO RELATED APPLICATIONS

The entire disclosure of Japanese Patent Application No. 2023-128611, filed on Aug. 7, 2023, including description, claims, drawings and abstract is incorporated herein by reference.

BACKGROUND OF THE INVENTION

Technical Field

The present invention relates to an inkjet recording apparatus and a recording medium.

Description of Related Art

There has been conventionally known inkjet textile printing using dye ink. However, the textile printing using dye ink requires a process of washing cloth, which is a recording medium, with water. Therefore, from a viewpoint of environmental load, inkjet textile printing using pigment ink has been examined.

In an inkjet recording apparatus using pigment ink, a binder resin needs to be added to the ink in order to cause the pigment to adhere to the surface of cloth fibers. However, when the pigment ink to which the binder resin is added is dried and fixed on a conveyance member that conveys the recording medium, unlike the dye ink, the pigment ink becomes difficult to remove.

Therefore, for example, JP 2014-185028A discloses an inkjet recording apparatus in which cleaning conditions of a cleaning member are changed depending on the degree of contamination of ink on a conveyance member.

SUMMARY OF THE INVENTION

However, in order to clean and remove the pigment ink once dried and fixed on the conveyance member, it is necessary to increase the intensity of the cleaning operation. Therefore, even if the pigment ink dried and fixed on the conveyance member can be cleaned and removed, the conveyance member may deteriorate.

The present invention has been made in view of such circumstances. Its object is to provide an inkjet recording apparatus and a recording medium that can suppress deterioration of a conveyance member due to cleaning.

To achieve at least one of the abovementioned objects, according to an aspect of the present invention, an inkjet recording apparatus reflecting one aspect of the present invention includes:

a hardware processor that controls a conveyance operation of a conveyance member that conveys a recording medium;

a head unit that forms an image by ejecting an ink containing a binder resin onto the recording medium on the conveyance member; and a cleaner that cleans the conveyance member, wherein the hardware processor, when instructed to stop the conveyance operation of the conveyance member, executes a cleaning mode in which conveyance of the conveyance member is continued to cause the cleaner to clean the conveyance member, or stops conveyance of the conveyance member to provide an alert that there is a possibility that foreign matter is adhering to the conveyance member.

To achieve at least one of the abovementioned objects, according to an aspect of the present invention, a non-transitory computer readable recording medium reflecting one aspect of the present invention stores a program causing a computer of an inkjet recording apparatus comprising a head unit that forms an image by ejecting an ink containing a binder resin onto the recording medium on a conveyance member, and a cleaner that cleans the conveyance member to control an operation of the conveyance member that conveys the recording medium, wherein the program, when instructed to stop a conveyance operation of the conveyance member, executes a cleaning mode in which conveyance of the conveyance member is continued to cause the cleaner to clean the conveyance member, or stops conveyance of the conveyance member to provide an alert that there is a possibility that foreign matter is adhering to the conveyance member.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

[Inkjet Recording Apparatus]

Figure 1:
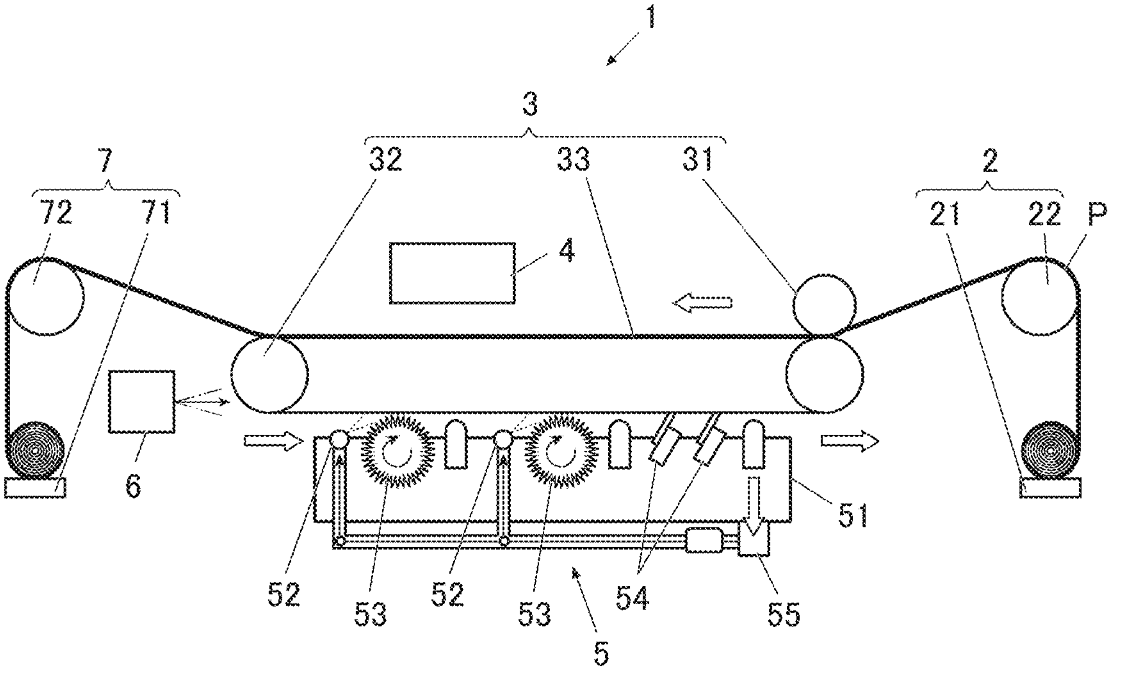
FIG. 1 is a schematic configuration diagram of an inkjet recording apparatus.

First, an example of a configuration of an inkjet recording apparatus 1 according to the present embodiment is disclosed. FIG. 1 is a schematic configuration diagram of the inkjet recording apparatus 1. The inkjet recording apparatus 1 includes a sheet feed device 2, a conveyance device 3, a head unit 4, a cleaner 5, a detector 6, and a sheet ejection device 7.

[Sheet Feed Device]

The sheet feed device 2 includes a recording medium setting portion 21. In the recording medium setting portion 21, a desired recording medium P is rotatably set, for example, in a state of being wound around a support shaft. The sheet feed device 2 is provided with a conveyor including a single or a plurality of first conveyance rollers 22 on a side closer to the inkjet recording apparatus 1 than the recording medium setting portion 21. In the sheet feed device 2, the recording medium P placed on the recording medium setting portion 21 is conveyed to the inkjet recording apparatus 1 by the conveyor.

[Recording Medium]

The recording medium P is, for example, a recording medium typically used for inkjet recording, such as paper, a cloth, a plastic film, or a glass plate. Hereinafter, a case where the recording medium P is a cloth will be exemplified, but the recording medium P is not limited thereto.

[Conveyance Device]

In the conveyance device 3, an endless conveyance belt 33 having a predetermined width is stretched between a driving roller 31 and a driven roller 32 which are arranged in parallel with each other at a predetermined interval. An upper surface of the conveyance belt 33 stretched between the driving roller 31 and the driven roller 32 is a placement surface on which the recording medium P is placed in close contact therewith.

An adhesive layer for bringing the recording medium P being conveyed into close contact with the placement surface is formed on the placement surface of the conveyance belt 33. The adhesive layer is formed by applying an adhesive called an anti-wrinkle stretcher agent. As the adhesive forming the adhesive layer, for example, a water-soluble resin, a pressure-sensitive resin, a heat-sensitive resin or the like is used.

Furthermore, the driving roller 31 is driven by a sub scanning motor (not illustrated). The sub scanning motor is under the control of a controller 100 (i.e., hardware processor), which will be described later. The driving roller 31 rotates at a predetermined speed in a conveyance direction which is a direction indicated by an arrow in FIG. 1 by rotational drive of the sub scanning motor. Then, the rotation of the driving roller 31 causes the conveyance belt 33 stretched between the driving roller 31 and the driven roller 32 to rotationally move. Such an operation causes the recording medium P placed on the placement surface of the conveyance belt 33 to be conveyed in the conveyance direction. As described above, in the present embodiment, the conveyance belt 33 functions as a conveyance member that conveys the recording medium P.

[Head Unit]

The head unit 4 records an image on the recording medium P conveyed by the conveyance device 3. The head unit 4 includes a plurality of inkjet heads that eject ink at an appropriate timing based on image data to record an image. The inkjet recording apparatus 1 includes, for example, four head units 4 corresponding to the respective inks of four colors of yellow (Y), magenta (M), cyan (C), and black (K). The four head units 4 are arranged at predetermined intervals in the order of Y, M, C, and K colors from the upstream side in the conveyance direction of the recording medium P. Note that the number of the head units 4 may be three or less or five or more. Alternatively, the head unit 4 may be formed by a single inkjet head.

[Ink]

As the ink ejected by the head unit 4, a pigment ink containing a solvent and a pigment is used.

(Solvent)

The solvent of the ink is not limited to a particular solvent, but for example, an organic solvent or water can be used. The ink may contain a single solvent or a plurality of solvents.

When water is used as the solvent of the ink, although the water is not limited to a particular type of water, for example, ion-exchanged water, distilled water, pure water, or the like can be used. The content of the water in the ink is preferably in the range of 30 to 70% by mass with respect to the total amount of the ink.

When an organic solvent is used as a solvent of the ink, a water-soluble organic solvent is preferably used. Examples of the water-soluble organic solvents to be used include monohydric alcohols (e.g., methanol, ethanol, propanol, pentanol, hexanol, cyclohexanol, benzyl alcohols), polyhydric alcohols (e.g., ethylene glycol, diethylene glycol, triethylene glycol, tetraethylene glycol, polyethylene glycol, propylene glycol, dipropylene glycol, tripropylene glycol, polypropylene glycol, glycerin, butylene glycol, hexanediol, pentanediol, hexanetriol, thiodiglycol, 1,2-butanediol, 1,3-butanediol, 1,2-pentanediol, 1,2-hexanediol, 1,6-hexanediol, 1,2-heptanediol, trimethylolpropane), polyhydric alcohol ethers (e.g., ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monobutyl ether, diethylene glycol dimethyl ether, propylene glycol monomethyl ether, propylene glycol monoethyl ether, triethylene glycol monomethyl ether, tetraethylene glycol monomethyl ether, tripropylene glycol monoethyl ether), amines (e.g., ethanol amine, N-ethyldiethanolamine, morpholine, N-ethylmorpholine, ethylene diamine, diethylene diamine, triethylene tetramine), amides (e.g., formaldehyde, N,N-dimethylformamide, N,N-dimethylacetamide), heterocycles (e.g., 2-pyrrolidone, N-methyl-2-pyrrolidone, N-cyclohexyl-2-pyrrolidone, 2-oxazolidone, 1,3-dimethyl-2-imidazolidine), sulfoxides (e.g., dimethylsulfoxide), and sulfones (e.g., sulfolane).

(Pigment)

As the pigment, an organic pigment or an inorganic pigment such as titanium oxide can be preferably used. The pigment is generally anionic. The ink may contain one or more kinds of pigments.

Examples of the organic pigments include azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, and diketopyrrolopyrrole.

Examples of the organic pigment for yellow include C. I. Pigment Yellow 12, C. I. Pigment Yellow 13, C. I. Pigment Yellow 14, C. I. Pigment Yellow 15, C. I. Pigment Yellow 15:3, C. I. Pigment Yellow 17, C. I. Pigment Yellow 74, C. I. Pigment Yellow 93, C. I. Pigment Yellow 128, C. I. Pigment Yellow 94, C. I. Pigment Yellow 138, and C. I. Pigment Yellow 155.

Examples of the organic pigment for magenta include C. I. Pigment Red 122, C. I. Pigment Violet 19, C. I. Pigment Red 202, C. I. Pigment Red 57:1, C. I. Pigment Red 177, C. I. Pigment Red 185, and C. I. Pigment Red 168.

Examples of the organic pigment for cyan include C. I. Pigment Blue 15, C. I. Pigment Blue 15:2, C. I. Pigment Blue 15:3, C. I. Pigment Blue 16, and C. I. Pigment Blue 60.

Examples of the organic pigment for black include C. I. Pigment Black 1, C. I. Pigment Black 6, and C. I. Pigment Black 7.

Titanium oxide has three crystal forms of an anatase type, a rutile type, and a brookite type, and general-purpose titanium oxides can be roughly classified into the anatase type and the rutile type. Although not limited to a particular crystal form, the crystal form of the titanium oxide is preferably the rutile type having a large refractive index and high concealability. Specific examples of the titanium oxide include TR series manufactured by Fuji Titanium Industry Co., Ltd., JR series manufactured by Tayca Corporation, and Tipaque manufactured by Ishihara Sangyo Kaisha, Ltd.

The pigment may be a self-dispersible pigment. The self-dispersible pigment is obtained by modifying a surface of a pigment particle with a group having a hydrophilic group, and has the pigment particle and the group having hydrophilicity bonded to the surface of the pigment particle.

Examples of the hydrophilic group include a carboxy group, a sulfonic acid group, and a phosphorus-containing group. Examples of the phosphorus-containing group include a phosphoric acid group, a phosphonic acid group, a phosphinic acid group, a phosphite group, and a phosphate group.

Examples of a commercially available self-dispersible pigment include Cab -0-Jet (registered trademark) 200K, 250C, 260M, and 270V (sulfonic acid group-containing self-dispersible pigments), Cab -0-Jet (registered trademark) 300K (carboxylic acid group-containing self-dispersible pigment), and Cab -0-Jet (registered trademark) 400K, 450C, 465M, 470V, and 480V (phosphoric acid group-containing self-dispersible pigments), manufactured by Cabot Corporation.

(Binder Resin)

As the ink ejected by the head unit 4, ink to which a binder resin is added is used. In particular, the fixability of the pigment is improved by adding an anionic binder resin to the ink.

As the anionic binder resin, for example, polyester, polyurethane, polyacrylic, polymethacrylic and the like having an acidic group such as a carboxy group, a sulfonyl group, a phosphorus-containing group (a phosphate group or a phosphonate group) can be used. To be more specific, as the anionic binder resin, products such as Acryset EMN series manufactured by Nippon Shokubai Co., Ltd., NeoCryl series manufactured by Kusumoto Chemicals, Ltd., Joncryl series manufactured by BASF, Takelac series manufactured by Mitsui Chemicals, Inc., HUX series manufactured by ADEKA Corporation, Evafanol series manufactured by Nicca Chemical Co., Ltd, and Superflex series manufactured by Dai-ichi Kogyo Seiyaku Co., Ltd. can be used.

The amount (solid content) of the binder resin to be added is preferably in the range of 5 to 15% by mass with respect to the total amount of the ink. When the amount of the binder resin added to the ink is 5% by mass or more, the effect of improving the fixability of the pigment can be obtained. In addition, when the amount of the binder resin added to the ink is 15% by mass or less, the amount of the aggregate which is attached onto the conveyance belt 33 is not excessively increased, which makes it possible to suppress deterioration of the cleaning performance of the cleaner 5.

Note that the components of ink are not limited to pigment and solvent. Components other than the pigment and the solvent may be further added to the ink, if necessary, within a range that does not impair the effects of the present invention. For example, a surfactant such as an anionic surfactant, a cationic surfactant, a nonionic surfactant, or an amphoteric surfactant may be added to the ink. In addition, an antiseptic agent such as an aromatic halogen compound (e.g., PreventolCMK), methylene dithiocyanate, a halogen-containing nitrogen-sulfur compound, and 1,2-benzisothiazolin-3-one (e.g., PROXEL GXL) may be added to the ink. Furthermore, a pH adjuster such as citric acid, sodium citrate, hydrochloric acid, and sodium hydroxide may be added to the ink.

A method of adding the binder resin to the ink is not limited to a method of containing the binder resin in the ink. For example, a first liquid containing a binder resin and a solvent and a second liquid containing a pigment and a solvent may be continuously ejected onto the recording medium P by a so-called wet-on-wet method. In the above-described configuration, a head unit that ejects the first liquid may be provided on the upstream side in the conveyance direction of the head unit 4 that ejects the second liquid. Adding the binder resin by the wet-on-wet method enables the ink to aggregate more easily. The inkjet recording apparatus 1 including the cleaner 5 according to the present embodiment can easily remove foreign matter adhering to the conveyance belt 33 even if the degree of aggregation of the foreign matter is high.

[Cleaner]

The cleaner 5 removes foreign matter (mainly solidified ink) adhering to the conveyance belt 33 of the conveyance device 3 by cleaning processing. The cleaner 5 includes, for example, a collector 51, a sprayer 52, a brush roller 53, a scraper 54, and a water storage 55. In the cleaner 5, the sprayer 52, the brush roller 53, and the scraper 54 are cleaning members that execute cleaning processing on the conveyance belt 33.

(Collector)

The collector 51 is a tub-shaped member that is open on the conveyance belt 33 side. The collector 51 collects a cleaning liquid dropping from the conveyance belt 33, the sprayer 52, the brush roller 53, the scraper 54, and the like. In the collector 51, for example, the sprayer 52, the brush roller 53, the scraper 54, and the water storage 55 are arranged in this order from the upstream side to the downstream side in the conveyance direction of the conveyance belt 33.

(Sprayer)

The sprayer 52 includes a nozzle bridged over the entire width in the width direction orthogonal to the conveyance direction of the conveyance belt 33. The nozzle of the sprayer 52 is provided at a position facing the placement surface of the conveyance belt 33. The nozzle of the sprayer 52 sprays the cleaning liquid supplied from the water storage 55 on the placement surface of the conveyance belt 33. The cleaning liquid is, for example, sprayed on the region between the brush roller 53 and the conveyance belt 33. Foreign matter adhering to the conveyance belt 33 can be removed by the cleaning liquid sprayed by the sprayer 52. Spraying the cleaning liquid on the conveyance belt 33 makes it possible to enhance the cleaning effect of the conveyance belt 33 by the subsequent brush roller 53. The cleaning liquid sprayed from the sprayer 52 is collected by the collector 51.

(Brush Roller)

The brush roller 53 is a roller-like brush in which a bristle bundle is provided on a rotary shaft bridged over the entire width in the width direction of the conveyance belt 33. Furthermore, the brush roller 53 is arranged such that a tip of the bristle bundle is in contact with the placement surface of the conveyance belt 33. With such an arrangement, the brush roller 53 rotates in a state of being in contact with the placement surface of the conveyance belt 33.

The brush roller 53 is configured to rotate in a direction opposite to the conveyance direction of the conveyance belt 33 at a contact position with the conveyance belt 33. The brush roller 53 is rotationally driven at a predetermined speed, so that the bristle bundle rubs against the placement surface of the conveyance belt 33. Through the rubbing, the brush roller 53 removes, from the placement surface of the conveyance belt 33, the foreign matter cleaned by the cleaning liquid sprayed by the sprayer 52. The foreign matter and the cleaning liquid removed by the brush roller 53 are collected by the collector 51.

(Scraper)

The scraper 54 is a flat plate-like member made of, for example, an elastic member such as rubber or a PET sheet. The scraper 54 is bridged over the entire width in the width direction of the conveyance belt 33. A tip of the scraper 54 is arranged in such a manner as to be in contact with the placement surface of the conveyance belt 33. With such an arrangement, the scraper 54 can scrape off the foreign matter and the cleaning liquid remaining on the conveyance belt 33. The foreign matter and the cleaning liquid scraped off by the scraper 54 are collected by the collector 51.

(Water Storage)

The water storage 55 is provided on the bottom surface side of the collector 51. The water storage 55 is configured to be able to store the foreign matter and the cleaning liquid collected by the collector 51. The water storage 55 is provided with a channel that communicates with the sprayer 52, and the channel is provided with a pump (not illustrated) that sprays a cleaning liquid and a filter (not illustrated) that removes foreign matter. With such an arrangement, the cleaning liquid sprayed from the sprayer 52 is collected by the collector 51 and then sent to the sprayer 52 from the water storage 55, thus allowing the sprayer 52 to repeatedly spray the cleaning liquid.

[Detector]

The detector 6 includes, for example, a monitoring camera, and is provided on the upstream side of the cleaner 5 in the conveyance direction. The detector 6 detects the presence or absence of a foreign matter on the placement surface (in particular, a region 33*a* described later) of the conveyance belt 33 before cleaning processing by the cleaner 5. In addition, the detector 6 detects a residual state of the foreign matter adhering to the placement surface from the 5 captured image of the placement surface of the conveyance belt 33 by known pattern matching processing.

[Sheet Ejection Device]

The sheet ejection device 7 is arranged on the downstream side in the conveyance direction of the conveyance device 3, and stores the recording medium P conveyed by the conveyance device 3. The sheet ejection device 7 includes a winder 71 that winds the recording medium P ejected by, for example, the conveyance device 3. Furthermore, the sheet ejection device 7 includes a conveyor including a single or a plurality of second conveyance rollers 72 on a side closer to the inkjet recording apparatus 1 than the winder 71. The recording medium P ejected from the conveyance device 3 is conveyed to the winder 71 side by the conveyor. The winder 71 winds the recording medium P conveyed by the conveyor into a roll shape as needed.

[Functional Configuration]

Figure 2:
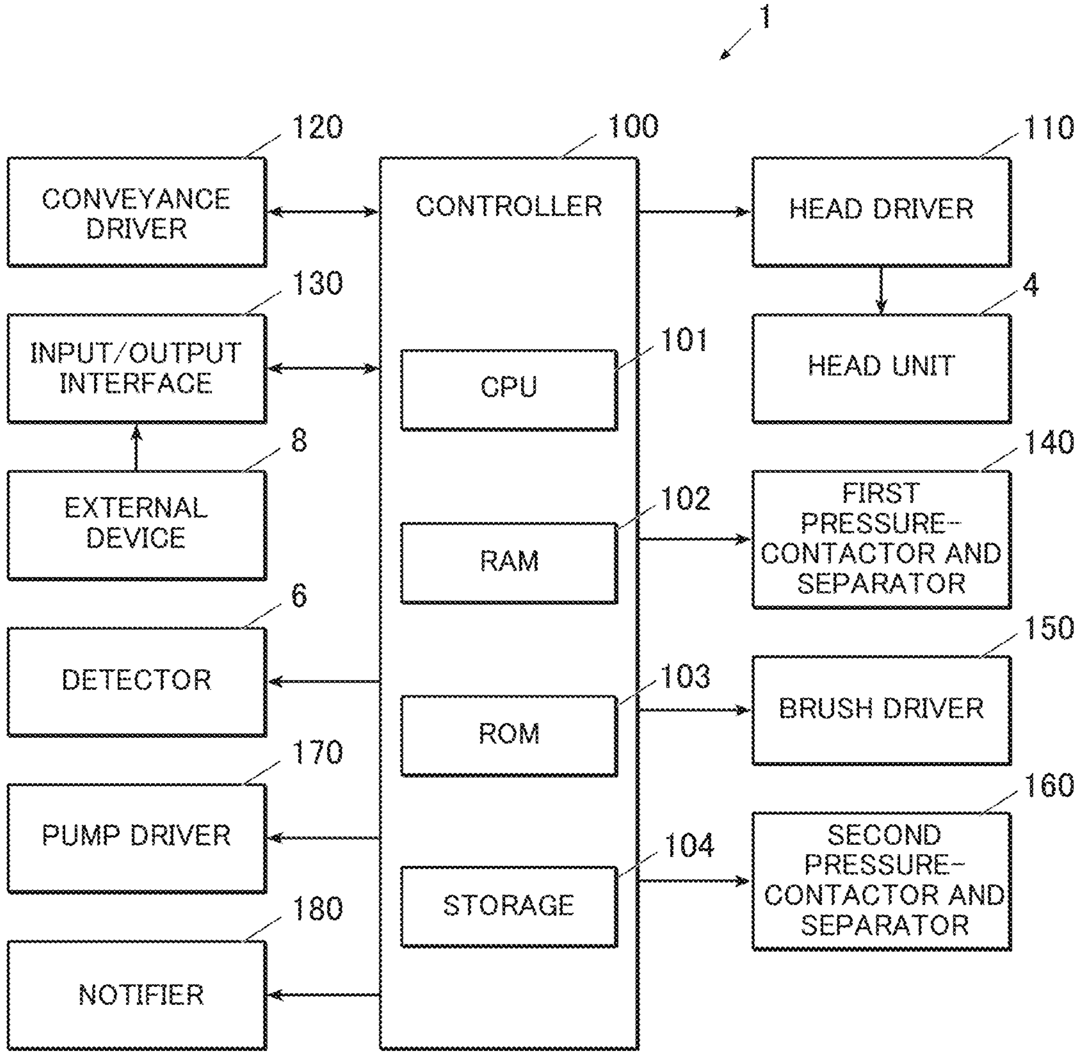
FIG. 2 is a block diagram of the inkjet recording apparatus.

FIG. 2 is a block diagram illustrating a main functional configuration of the inkjet recording apparatus 1. The inkjet recording apparatus 1 includes a controller 100, a head driver 110, a conveyance driver 120, an input/output interface 130, a first pressure-contactor and separator 140, a brush driver 150, a second pressure-contactor and separator 160, a pump driver 170, and a notifier 180.

[Controller]

The controller 100 includes a central processing unit (CPU) 101, a random access memory (RAM) 102, a read only memory (ROM) 103, a storage 104, and the like.

(CPU)

The CPU 101 reads various control programs and setting data stored in the ROM 103, stores the read programs and setting data in the RAM 102, and executes the programs to execute various types of arithmetic processing. The CPU 101 integrally controls the entire operation of the inkjet recording apparatus 1.

(RAM)

The RAM 102 provides a working memory space for the CPU 101 and stores temporary data. Note that the RAM 102 may include a non-volatile memory.

(ROM)

The ROM 103 stores various control programs to be executed by the CPU 101, setting date, and the like. Note that a rewritable non-volatile memory such as an electrically erasable programmable read only memory (EEPROM) or a flash memory may be used instead of the ROM 103.

(Storage)

The storage 104 stores print jobs (image recording commands) and image data related to the print jobs, the print jobs and image data being input from an external device 8 via the input/output interface 130. As the storage 104, for example, a hard disk drive (HDD) is used, and a dynamic random access memory (DRAM) or the like may be used in combination therewith.

[Head Driver]

Under the control of the controller 100, the head driver 110 supplies a drive signal corresponding to image data to the head unit 4 at appropriate timing. Through the supply, the head driver 110 causes the nozzle of the head unit 4 to eject ink in an amount corresponding to the pixel values of the image data.

[Conveyance Driver]

Under the control of the controller 100, the conveyance driver 120 supplies a drive signal to the sub scanning motor of the driving roller 31. Through the supply, the conveyance driver 120 rotationally moves the conveyance belt 33 at a predetermined speed and timing to control the conveyance operation.

[Input/Output Interface]

The input/output interface 130 mediates transmission and reception of data between the external device 8 and the controller 100. The input/output interface 130 includes, for example, various serial interfaces and/or various parallel interfaces.

[External Device]

The external device 8 is, for example, a personal computer. The external device 8 supplies an image recording command (print job), image data, and the like to the controller 100 via the input/output interface 130.

[First Pressure-Contactor and Separator]

Under the control of the controller 100, the first pressure-contactor and separator 140 brings the brush roller 53 into pressure contact with the placement surface of the conveyance belt 33 and separates the brush roller 53 from the placement surface of the conveyance belt 33. Through the control, the first pressure-contactor/separator 140 controls an amount of a cleaning nip formed between the placement surface of the conveyance belt 33 and the brush roller 53.

[Brush Driver]

The brush driver 150 controls the rotational speed (the rotation amount per unit time) of the brush roller 53 under the control of the controller 100.

[Second Pressure-Contactor and Separator]

Under the control of the controller 100, the second pressure-contactor and separator 160 brings the scraper 54 into pressure contact with the placement surface of the conveyance belt 33 and separates the scraper 54 from the placement surface of the conveyance belt 33. Through the control, the second pressure-contactor/separator 160 controls an amount of a cleaning nip formed between the placement surface of the conveyance belt 33 and the scraper 54.

[Pump Driver]

The pump driver 170 changes a drive mode of a pump provided in the channel communicating between the water storage 55 and the sprayer 52 under the control of the controller 100. Through the control, the pump driver 170 controls a spraying pressure (water pressure) of the cleaning liquid by the sprayer 52.

[Notifier]

The notifier 180 is, for example, a display having a screen or a communicator capable of communicating with another device through a network. The notifier 180 provides the user with various alerts under the control of the controller 100.

[Regular Cleaning Processing]

Figure 3:
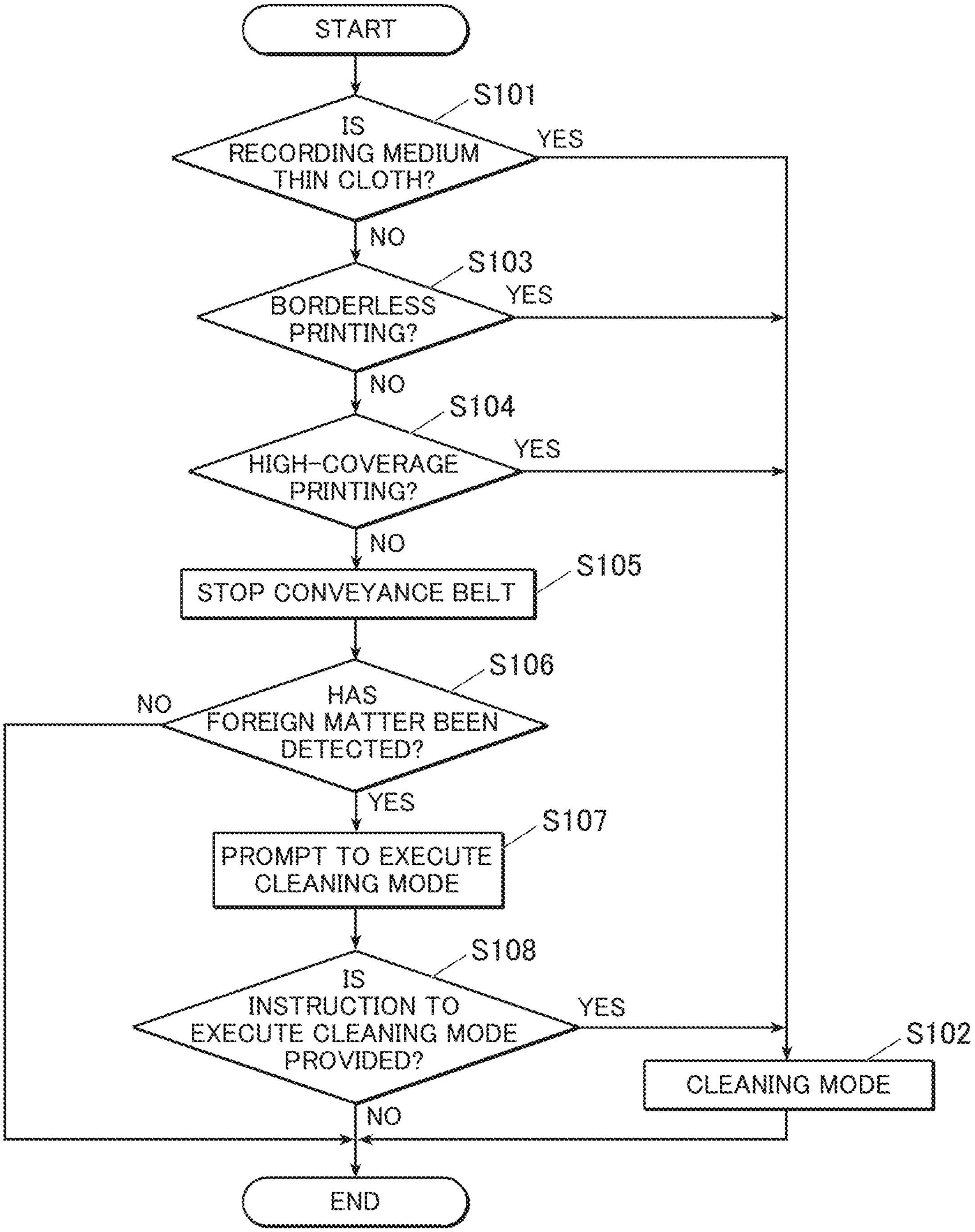
FIG. 3 is a flowchart of regular cleaning processing.

Next, regular cleaning processing of the conveyance belt 33 by the cleaner 5 in the inkjet recording apparatus 1 will be described. The regular cleaning processing is executed after the completion of the image formation processing by the head unit 4. FIG. 3 is a flowchart of the regular cleaning processing. The regular cleaning processing is implemented through cooperation between the controller 100 and the cleaner 5.

After the completion of the image formation processing, the controller 100 determines whether the image formation processing is set such that foreign matter is likely to adhere to the conveyance belt 33. To be specific, first, the controller 100 determines whether the recording medium P is a thin cloth (Step S101). Note that in the present embodiment, the thin cloth refers to a low-density cloth (e.g., 300 mg/$cm^3$ or less). However, since a low-density thick cloth also exists, for example, cloth having a thickness of 0.2 mm or less may be referred to as the "thin cloth".

If the recording medium P is a thin cloth (Step S101; Yes), the controller 100 executes the cleaning mode (Step S102). After the execution of the cleaning mode, the controller 100 ends the regular cleaning processing.

[Cleaning Mode]

Figure 4A:
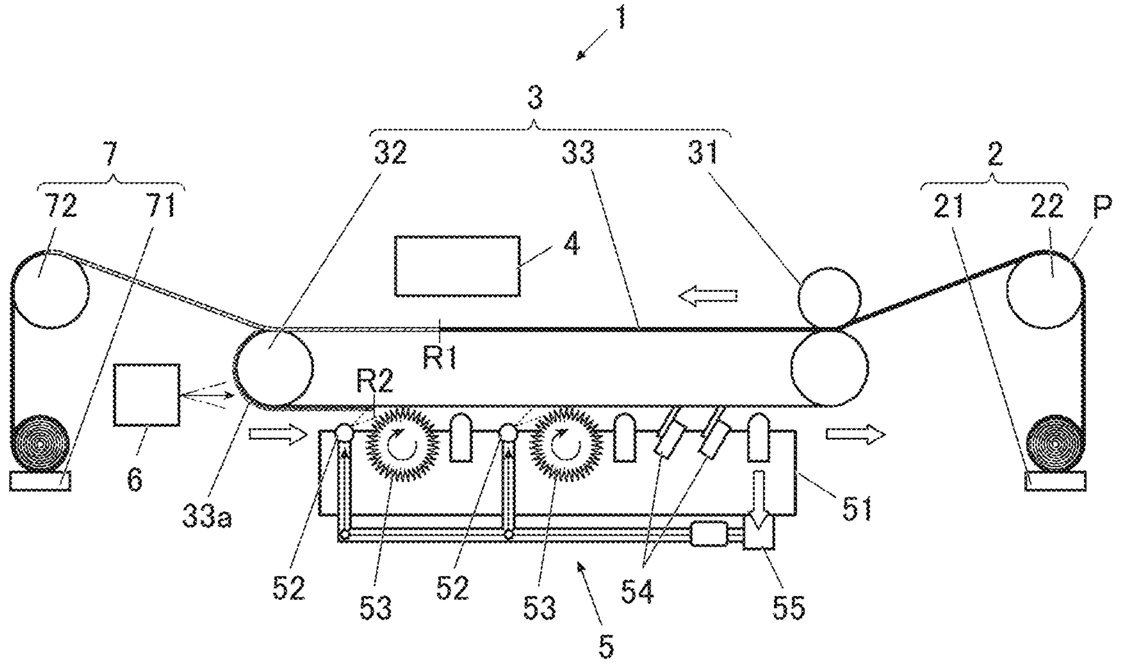
FIG. 4A is a schematic configuration diagram of the inkjet recording apparatus before execution of a cleaning mode.

The cleaning mode executed in Step S102 will be described with reference to FIG. 4. As illustrated in FIG. 4A, a region of the conveyance belt 33 from a position R1 located under a lower surface of an upstream end in the conveyance direction of an image forming region of the recording medium P to a position R2 located at an upstream end in the conveyance direction of the cleaner 5 is defined as a region 33*a*. In a case where the conveyance belt 33 is stopped immediately after ink ejection by the head unit 4 is ended, the region 33*a* cannot be subjected to the cleaning processing even if foreign matter adheres thereto, and therefore, the foreign matter may be fixed on the conveyance belt 33.

Figure 4B:
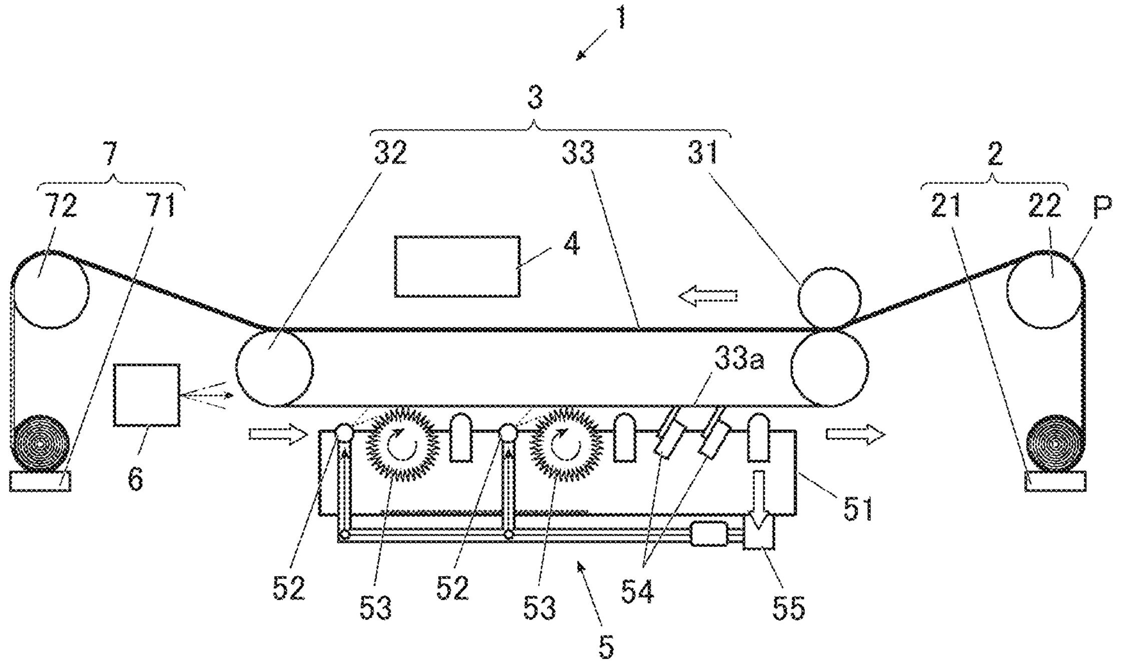
FIG. 4B is a schematic configuration diagram of the inkjet recording apparatus during execution of the cleaning mode.

Therefore, in the cleaning mode, the controller 100 causes the conveyance belt 33 to be continuously conveyed for a predetermined time (preferably 5 to 30 seconds) after the end of ink ejection. The controller 100 performs the control to stop the conveyance belt 33 at a position extending from the normal stop position. As illustrated in FIG. 4B, the control enables the cleaner 5 to clean the region 33*a*. Note that the stop position of the conveyance belt 33 in the cleaning mode is preferably a position where at least the upstream end in the conveyance direction of the region 33*a* reaches the cleaning member of the cleaner 5. Thus, the entirety of the region 33*a* can be subjected to the cleaning processing by the cleaner 5.

Returning to FIG. 3, if the recording medium P is not a thin cloth (Step S101; No), the controller 100 determines whether the image formation processing is borderless printing or not (Step S103). If the image formation processing is borderless printing (Step S103; Yes), the controller 100 executes the cleaning mode (Step S102). After the execution of the cleaning mode, the controller 100 ends the regular cleaning processing.

If the image formation processing is bordered printing (Step S103; No), the controller 100 determines whether the image formation processing is high-coverage printing (Step S104). Note that in the present embodiment, the high-coverage printing refers to image formation processing with a coverage of 50% or more, for example.

If the image formation processing is the high-coverage printing (Step S104; Yes), the controller 100 executes the cleaning mode (Step S102). After the execution of the cleaning mode, the controller 100 ends the regular cleaning processing.

If the image formation processing is not the high-coverage printing (Step S104; No), the controller 100 stops the conveyance belt 33 (Step S105). Then, the controller 100 determines whether the detector 6 has detected foreign matter (Step S106).

If the detector 6 does not detect foreign matter (Step S106; No), no foreign matter adheres to the region 33*a*. Therefore, the controller 100 ends the regular cleaning processing without executing the cleaning mode.

If the detector 6 has detected foreign matter (Step S106; Yes), the controller 100 prompts the user to execute the cleaning mode by the notifier 180 (Step S107). Then, the controller 100 accepts an instruction to execute the cleaning mode from the user (Step S108).

If the instruction to execute the cleaning mode is not accepted from the user (Step S108; No), the controller 100 ends the regular cleaning processing without executing the cleaning mode.

If the instruction to execute the cleaning mode is accepted from the user (Step S108; Yes), the controller 100 executes the cleaning mode (Step S102). After the execution of the cleaning mode, the controller 100 ends the regular cleaning processing.

[Irregular Cleaning Processing]

Next, irregular cleaning processing of the conveyance belt 33 by the cleaner 5 in the inkjet recording apparatus 1 will be described. The irregular cleaning processing is executed when the conveyance belt 33 abnormally stops. Similarly to the regular cleaning processing, the irregular cleaning processing is implemented through cooperation between the controller 100 and the cleaner 5.

[When Error Occurs]

Figure 5:
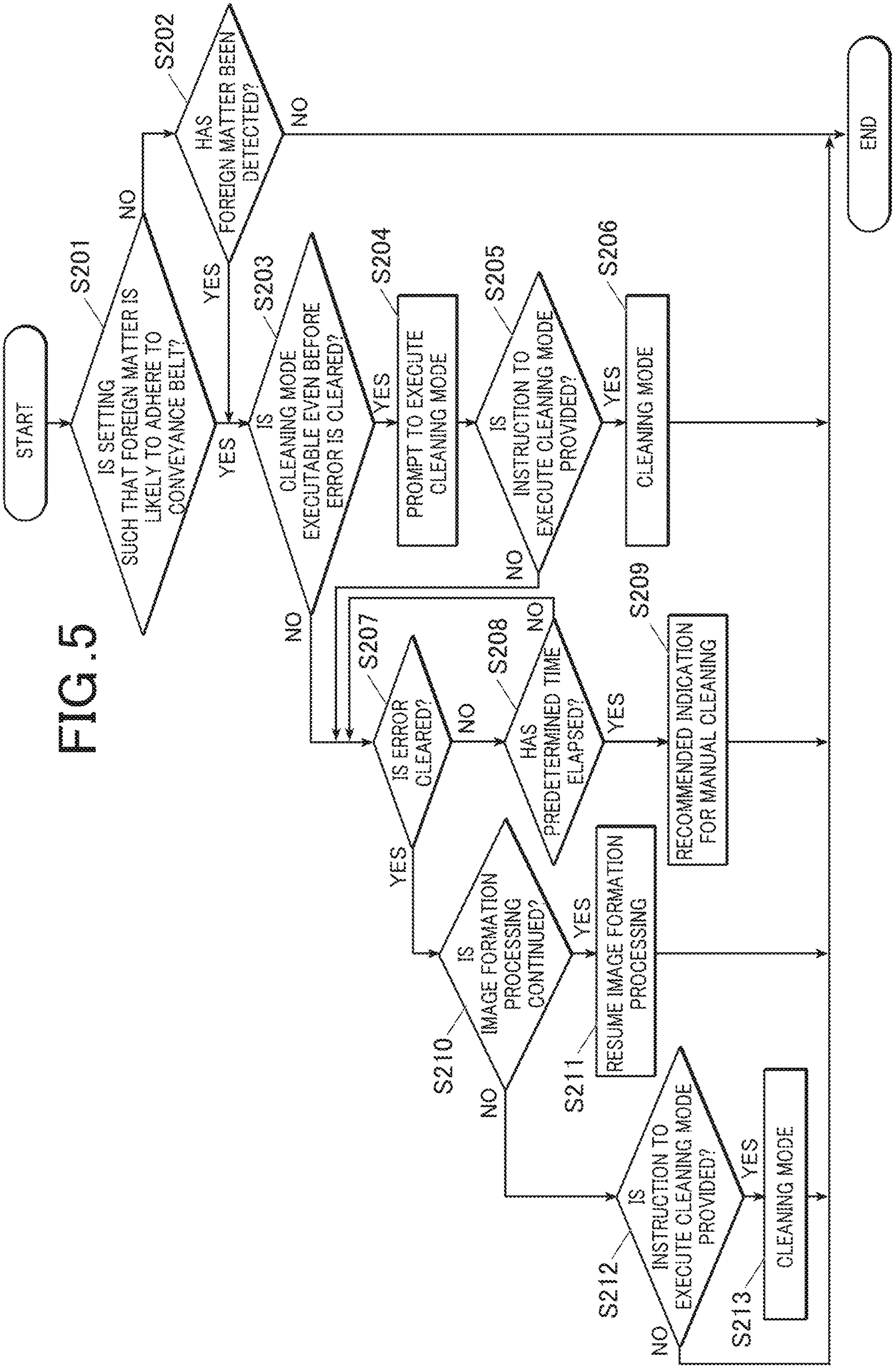
FIG. 5 is a flowchart of irregular cleaning processing when an error occurs.

FIG. 5 is a flowchart of the irregular cleaning processing in the case where the abnormal stop of the conveyance belt 33 is based on the occurrence of an error. First, the controller 100 determines whether the image formation processing before the occurrence of the error satisfies predetermined conditions (Step S201). The predetermined conditions indicate whether the setting is such that foreign matter is likely to adhere to the conveyance belt 33, that is, whether at least one of the conditions indicated in Steps S101, S103, and S104 is satisfied. Therefore, the detailed description thereof will be omitted.

If the predetermined conditions are not satisfied (Step S201; No), the controller 100 determines whether the detector 6 has detected foreign matter (Step S202).

If the detector 6 does not detect foreign matter (Step S202; No), since no foreign matter adheres to the region 33*a*, the controller 100 ends the irregular cleaning processing. That is, the controller 100 waits until the error is cleared by the user. Then, when the error is cleared, the controller 100 returns as usual.

If the predetermined conditions are satisfied (Step S201; Yes), or if the detector 6 has detected foreign matter (Step S202; Yes), the controller 100 determines whether the cleaning mode can be executed even before the error is cleared (Step S203). For example, when the content of the error indicates a malfunction of the tank or the pump, since the conveyance belt 33 can be driven, the cleaning mode can be executed even before the error is cleared by the user.

If the cleaning mode can be executed even before the error is cleared (Step S203; Yes), the controller 100 prompts the user to execute the cleaning mode by the notifier 180 (Step S204). Then, the controller 100 accepts the instruction to execute the cleaning mode from the user (Step S205).

If the instruction to execute the cleaning mode is accepted (Step S205; Yes), the controller 100 executes the cleaning mode (Step S206). Since the content of the cleaning mode is the same as that of Step S102, the detailed description thereof will be omitted. After the execution of the cleaning mode, the controller 100 stops the conveyance belt 33 again, and ends the irregular cleaning processing.

If the cleaning mode cannot be executed before the error is cleared (Step S203; No), or if the instruction to execute the cleaning mode is not accepted (Step S205; No), the controller 100 waits until the error is cleared.

The controller 100 determines whether the error is cleared (Step S207). If the error is not cleared (Step S207; No), the controller 100 determines whether a predetermined time has elapsed since the error state occurred (Step S208).

If the predetermined time has elapsed (Step S208; Yes), the controller 100 recommends manual cleaning of the region 33*a* to the user by the notifier 180 (Step S209). Then, the controller 100 ends the irregular cleaning processing without executing the cleaning mode. Note that the controller 100 preferably controls the cleaner 5 to execute the cleaning processing on the region 33*a* at the time of recovery from the error.

If the error is cleared (Step S207; Yes), the controller 100 accepts an instruction from the user as to whether to continue the image formation processing (Step S210).

If an instruction to continue the image formation processing is accepted (Step S210; Yes), the controller 100 resumes the image formation processing (Step S211). In this case, the conveyance belt 33 is driven to be conveyed, whereby the cleaning processing is also executed on the region 33*a* by the cleaner 5. Therefore, the controller 100 does not execute the cleaning mode.

If the instruction to continue the image formation processing is not accepted (Step S210; No), the controller 100 accepts an instruction from the user as to whether to execute the cleaning mode (Step S212).

If the instruction to execute the cleaning mode is accepted (Step S212; Yes), the controller 100 executes the cleaning mode (Step S213). After the execution of the cleaning mode, the controller 100 ends the irregular cleaning processing. On the other hand, if the instruction to execute the cleaning mode is not accepted (Step S212; No), the controller 100 ends the irregular cleaning processing without executing the cleaning mode. Note that if the instruction to execute the cleaning mode is not accepted, it is preferable that the controller 100 controls the cleaner 5 to execute the cleaning process of the region 33*a* before the execution of the next image formation processing.

[During Emergency Stop]

Figure 6:
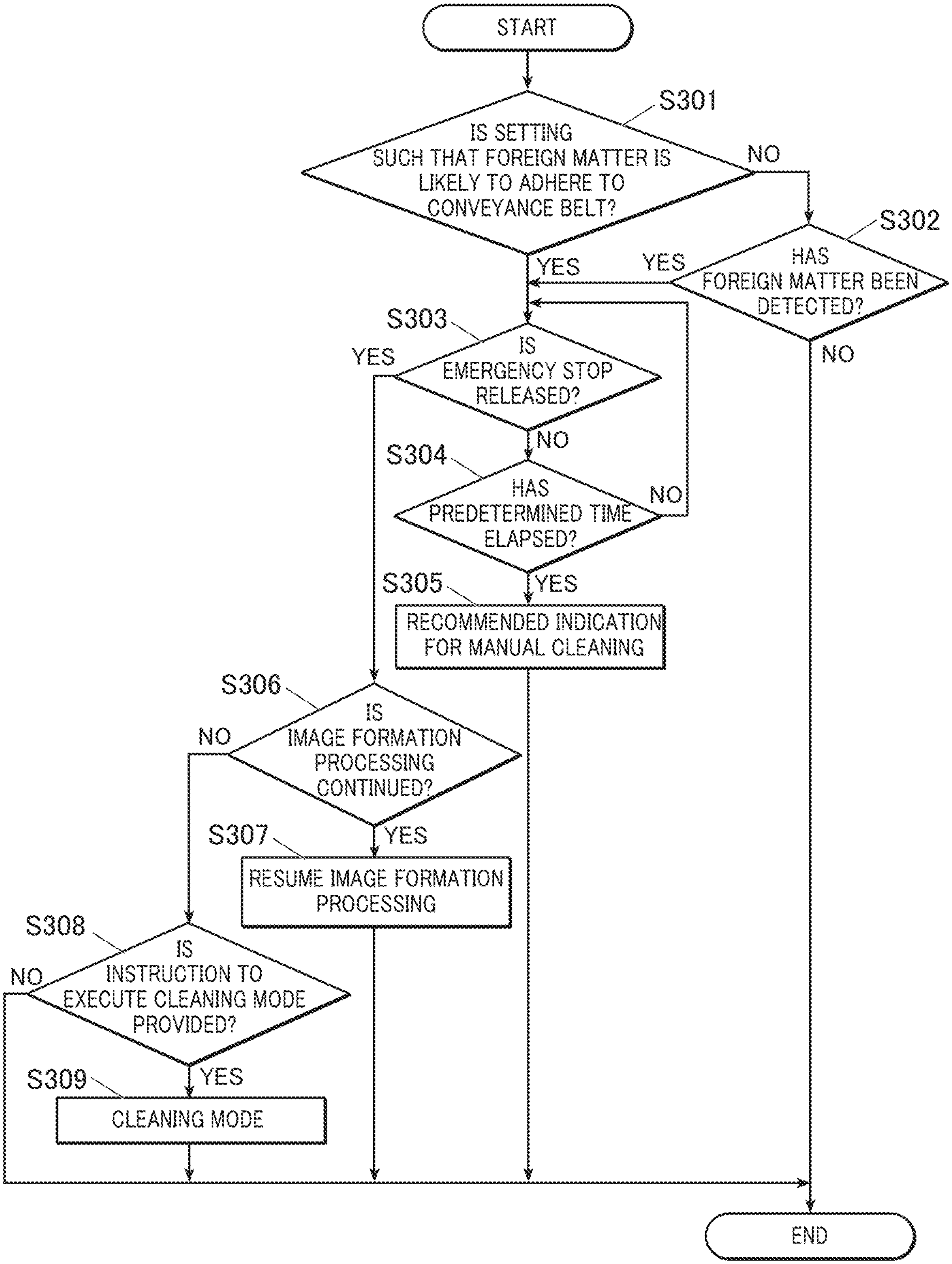
FIG. 6 is a flowchart of irregular cleaning processing at the time of abnormal stopping.

Next, the irregular cleaning processing in a case where the abnormal stop of the conveyance belt 33 is based on the emergency stop will be described with reference to FIG. 6. The emergency stop of the conveyance belt 33 occurs, for example, when an emergency stop button of the inkjet recording apparatus 1 is pressed, when a power outage occurs, or the like. Note that hereinafter, the detailed description of substantially the same contents as those in the case where the abnormal stop of the conveyance belt 33 is based on the error occurrence will be omitted.

First, the controller 100 determines whether the image formation processing before the emergency stop satisfies predetermined conditions (Step S301). If the predetermined conditions are not satisfied (Step S301; No), the controller 100 determines whether the detector 6 has detected foreign matter (Step S302). If the detector 6 does not detect foreign matter (Step S302; No), since no foreign matter adheres to the region 33*a*, the controller 100 ends the irregular cleaning processing.

If the predetermined conditions are satisfied (Step S301; Yes), or if the detector 6 has detected foreign matter (Step S302; Yes), the controller 100 determines whether the emergency stop state is released (Step S303).

If the emergency stop state is not released (Step S303; No), the controller 100 determines whether a predetermined time has elapsed since the emergency stop state e occurred (Step S304).

If the predetermined time has elapsed (Step S304; Yes), the controller 100 recommends manual cleaning of the region 33*a* to the user by the notifier 180 (Step S305). Then, the controller 100 ends the irregular cleaning processing without executing the cleaning mode.

If the emergency stop state is released (Step S303; Yes), the controller 100 accepts an instruction as to whether to continue the image formation processing (Step S306).

If the instruction to continue the image formation processing is accepted (Step S306; Yes), the controller 100 resumes the image formation processing (Step S307). In this case, the conveyance belt 33 is driven to be conveyed, whereby the cleaning processing is also executed on the region 33*a* by the cleaner 5. Therefore, the controller 100 does not execute the cleaning mode.

If the instruction to continue the image formation processing is not accepted (Step S306; No), the controller 100 accepts an instruction as to whether to execute the cleaning mode (Step S308).

If the instruction to execute the cleaning mode is accepted (Step S308; Yes), the controller 100 executes the cleaning mode (Step S309). After the execution of the cleaning mode, the controller 100 ends the irregular cleaning processing. On the other hand, if the instruction to execute the cleaning mode is not accepted (Step S308; No), the controller 100 ends the irregular cleaning processing without executing the cleaning mode.

EXAMPLES

Next, with respect to Examples and Comparative Examples of the present invention, the results of evaluating preferred configurations by various tests will be described. Hereinafter, the present invention will be specifically described with reference to Examples, but the present invention is not limited thereto.

[Evaluation of Regular Cleaning Processing]

[Test 1-1. Belt Cleaning Performance and Productivity Test]

An inkjet recording apparatus 1 to eject an aqueous pigment ink, as illustrated in FIG. 1, is set to operate as in each of Example 1 and Comparative Examples 1 and 2 below.

Example 1

The inkjet recording apparatus 1 was set so as to continuously shift to a cleaning mode after the end of the image formation processing when predetermined conditions under which foreign matter is likely to adhere to the conveyance belt 33 were satisfied or when the detector 6 detected the foreign matter.

Comparative Example 1

Regardless of the conditions, the inkjet recording apparatus 1 was set to stop the driving of the conveyance belt 33 every time the image formation processing was completed.

Comparative Example 2

Regardless of the conditions, the inkjet recording apparatus 1 was set to perform conveyance drive continuously from the image formation processing so that the region 33*a* reached the cleaner 5 every time the image formation processing was completed.

The inkjet recording apparatuses 1 of Example 1 and Comparative Examples 1 and 2 were caused to execute the operations of the following sets α to γ.

(Set α)

After the image formation processing with the settings of thick cloth, bordered, and low coverage, the image formation processing with the settings of thin cloth, bordered, and low coverage was executed.

(Set β)

After the image formation processing with the settings of thick cloth, bordered, and low coverage, the image formation processing with the settings of thick cloth, borderless, and low coverage was executed.

(Set γ)

After the image formation processing with the settings of thick cloth, bordered, and low coverage, the image formation processing with the settings of thick cloth, bordered, and high coverage was executed.

Note that in the present example, the term "thick cloth" refers to a cloth that has a thickness of 0.4 mm or more and a density of 400 mg/cm$^3$ or more. Furthermore, the term "thin cloth" refers to a cloth that has a thickness of 0.2 mm or less and a density of 300 mg/cm$^3$ or less.

The "low coverage" has a print density of 1%, and the "high coverage" has a print density of 100%. Furthermore, the image forming surface of the recording medium P is preliminarily coated with a pretreatment agent ink as a coagulant.

After the operations of the sets α to γ, the belt cleaning performance and the productivity of each inkjet recording apparatus 1 were evaluated. When the conveyance belt 33 is visually confirmed, the belt cleaning performance is evaluated as "G (Good)" in a case where no foreign matter adheres to the placement surface, and as "NG (No Good)" in a case where foreign matter is adhering to the placement surface. The productivity is evaluated as "A" when the time taken from the start to the completion of each set is 3 minutes or less, as "C" when the time is 10 minutes or more, and as "B" in other cases.

The results of Test 1-1 are shown in Table I.

TABLE I

| | PRINTING CONDITION | | | BELT CLEANING PERFORMANCE | | | PRODUCTIVITY | | |
|---|---|---|---|---|---|---|---|---|---|
| | CLOTH TYPE | BORDERED PRINTING | COVERAGE | EXAMPLE 1 | COMPARATIVE EXAMPLE 1 | COMPARATIVE EXAMPLE 2 | EXAMPLE 1 | COMPARATIVE EXAMPLE 1 | COMPARATIVE EXAMPLE 2 |
| SET α | THICK CLOTH | BORDERED | LOW | G | NG | G | B | B | C |
| | THIN CLOTH | BORDERED | LOW | | | | | | |
| SET β | THICK CLOTH | BORDERED | LOW | G | NG | G | B | B | C |
| | THICK CLOTH | BORDERLESS | LOW | | | | | | |
| SET γ | THICK CLOTH | BORDERED | LOW | G | NG | G | B | B | C |
| | THICK CLOTH | BORDERED | HIGH | | | | | | |

[Evaluation]

In Comparative Example 1, the cleaning mode is not executed even when the predetermined conditions under which foreign matter is likely to adhere to the conveyance belt 33 are satisfied. Therefore, as shown in Table I, Comparative Example 1 is lower in the belt cleaning performance as compared with Example 1 and Comparative Example 2 in which the cleaning mode is executed. On the other hand, in Comparative Example 1, since the cleaning mode was not executed, the next image formation processing could be immediately started, and the standby time could be shortened. However, in Comparative Example 1, an error caused by the ink fixed to the conveyance belt 33 occurred, and the printing time was increased. Therefore, as compared with Example 1, the overall productivity was not improved.

In Comparative Example 2, the cleaning mode is executed even if the setting is not such that foreign matter is likely to adhere to the conveyance belt 33. Therefore, as shown in Table I, Comparative Example 2 is excellent in the belt cleaning performance, but is lower in productivity than Example 1 and Comparative Example 1.

In contrast to Comparative Examples 1 and 2, in Example 1, the cleaning mode is executed under conditions under which foreign matter is likely to adhere to the conveyance belt 33, or when the detector 6 has detected foreign matter. Therefore, both of the belt cleaning performance and the productivity can be achieved.

[Test 1-2. Wear Resistance Test of Conveyance Member]

The inkjet recording apparatuses 1 of Example 1 and Comparative Examples 1 and 2 were caused to execute the operations of the sets α to γ five sets each, that is, a total of 15 sets. Thereafter, the wear resistance of the conveyance belt 33 of each inkjet recording apparatus 1 was evaluated. The wear resistance is evaluated as "G" when the placement surface is not visually scratched, and is evaluated as "NG" when the placement surface is scratched. "G" represents good, and "NG" represent not good.

The results of Test 1-2 are shown in Table II.

TABLE II

| | WEAR-RESISTANCE |
|---|---|
| EXAMPLE 1 | G |
| COMPARATIVE EXAMPLE 1 | NG |
| COMPARATIVE EXAMPLE 2 | NG |

Since the inkjet recording apparatus 1 of Comparative Example 1 does not execute the cleaning mode, the ink is fixed to the placement surface. Therefore, the placement surface was worn when ink thus fixed was removed. Furthermore, since the inkjet recording apparatus 1 of Comparative Example 2 always executed the cleaning mode, the placement surface was worn by the cleaning processing. On the other hand, the inkjet recording apparatus 1 of Example 1 executes the cleaning mode when the setting is such that foreign matter is likely to adhere to the conveyance belt 33 or when the detector 6 has detected foreign matter, and therefore wear of the placement surface was reduced.

[Test 2. Evaluation of Irregular Cleaning Processing]

[Belt Cleaning Performance Test]

An inkjet recording apparatus 1 to eject an aqueous pigment ink, as illustrated in FIG. 1, is set to operate as in each of Example 2 and Comparative Example 3 below.

Example 2

In a case where the inkjet recording apparatus 1 came to an emergency stop during image formation processing under the above predetermined conditions and ended the image formation processing upon return from the emergency stop, the notifier 180 was set to recommend the user to execute the cleaning mode. Furthermore, the controller 100 was caused to execute the cleaning mode by the instruction operation of the user.

Comparative Example 3

In a case where the inkjet recording apparatus 1 came to an emergency stop during image formation processing under the predetermined conditions and ended the image formation processing upon return from the emergency stop, the controller 100 was set not to execute the cleaning mode.

[Evaluation of Belt Cleaning Performance]

During execution of the image formation processing with thin cloth, bordered, and low coverage by the inkjet recording apparatus 1 of each of Example 2 and Comparative Example 3, the inkjet recording apparatus 1 was forcibly stopped by pressing the emergency stop button. Then, after one hour, the emergency stop was released and the image formation processing was ended, and then the belt cleaning performance of each inkjet recording apparatus 1 was evaluated. As in Test 1-1, the belt cleaning performance is evaluated as "G" when no foreign matter adheres to the placement surface and evaluated as "NG" when foreign matter is adhering to the placement surface.

[Image Quality Evaluation]

One day after the end of the belt cleaning performance test, image formation processing was executed with each of the inkjet recording apparatuses 1 of Example 2 and Comparative Example 3, and the image quality was evaluated. The image quality is evaluated as "NG" in a case where there is image quality failure due to the fabric bubble and as "G" in a case where there is no image quality failure.

The results of Test 2 are shown in Table III.

TABLE III

| PRINTING CONDITION | | | BELT CLEANING PERFORMANCE | | IMAGE QUALITY | |
|---|---|---|---|---|---|---|
| CLOTH TYPE | BORDERED PRINTING | COVERAGE | EXAMPLE 2 | COMPARATIVE EXAMPLE 3 | EXAMPLE 2 | COMPARATIVE EXAMPLE 3 |
| THIN CLOTH | BORDERED | LOW | G | NG | G | NG |

When Example 2 and Comparative Example 3 are compared with each other, in a case where the inkjet recording apparatus 1 is emergently stopped during the image formation processing under the conditions under which foreign matter is likely to adhere, the controller 100 is caused to execute the cleaning mode at the time of return, and thus the ink jet recording apparatus 1 excellent in the belt cleaning performance is obtained. Excellent belt cleaning performance of the inkjet recording apparatus 1 can also prevent image quality failure due to the fabric bubble caused by foreign matter adhering to the conveyance belt 33.

Effects of Embodiment

As described above, the inkjet recording apparatus 1 according to the present embodiment includes the controller 100 that controls the operation of the conveyance belt 33 serving as a conveyance member that conveys the recording medium P. The inkjet recording apparatus 1 further includes the head unit 4 that ejects an ink containing a binder resin onto the recording medium P on the conveyance member. The inkjet recording apparatus 1 further includes the cleaner 5 that cleans the conveyance member. Furthermore, when instructed to stop the conveyance operation of the conveyance belt 33, the controller 100 executes a cleaning mode in which the conveyance of the conveyance belt 33 is continued to cause the cleaner 5 to perform cleaning. Alternatively, the controller 100 stops the conveyance of the conveyance belt 33 and issues an alert that foreign matter may be adhering to the conveyance belt 33. According to this configuration, the conveyance member to which foreign matter is adhering due to ink ejection is cleaned by the cleaner 5, thus preventing the foreign matter from being fixed on the conveyance belt 33. Therefore, deterioration of the conveyance belt 33 due to cleaning can be suppressed.

Furthermore, the controller 100 causes the conveyance belt 33 to be conveyed to the cleaner 5 at least as far as the upstream end in the conveyance direction of the region 33*a*. According to this configuration, the entirety of the region 33*a* to which foreign matter may be adhering can be subjected to cleaning processing by the cleaner 5.

Furthermore, in the case where the image formation under the predetermined conditions is ended and the stop is instructed, the controller 100 executes the cleaning mode. According to this configuration, the cleaning mode is executed only when the cleaning processing is required. Therefore, it is possible to reduce loss of the recording medium P and downtime. Furthermore, it is possible to suppress occurrence of an error or deterioration of the conveyance belt 33 at the time of removal of foreign matter due to the foreign matter being fixed to the conveyance belt 33 without execution of the cleaning processing although the foreign matter is adhering to the conveyance belt 33. In addition, the cleaning processing is automatically executed for the conveyance belt 33, thereby reducing burden on the user.

The controller 100 provides an alert after the cancellation of the error stop or the emergency stop, and executes the cleaning mode in response to a user instruction. According to this configuration, even when the conveyance belt 33 is abnormally stopped, the user can easily cope with the abnormal stop.

Other Configurations

Although one embodiment of the present invention has been described above, the scope of the present invention is not limited to the above-described embodiment. The scope of the present invention includes the scope of the invention described in the scope of the claims and the scope of equivalents thereof.

In addition, for example, in the above description, a configuration in which the conveyance device 3 includes the conveyance belt 33 and the recording medium P is conveyed while being placed on the conveyance belt 33 has been exemplified, but the invention is not limited thereto. That is, a configuration in which the conveyance device 3 does not include the conveyance belt 33 and conveys the recording medium P in a so-called roll-to-roll manner may be adopted. In the above-described configuration, the recording medium P tensioned and stretched over the plurality of conveyance rollers (e.g., the first conveyance roller 22 and the second conveyance roller 72) is conveyed. Therefore, the plurality of conveyance rollers serve as a conveyance member that conveys the recording medium P.

Although the definitions of “thin cloth” and “high coverage” that are conditions under which foreign matter is likely to adhere to the conveyance belt 33 have been described above, there is no limitation thereto. For example, a cloth having a thickness of 50 deniers and formed of a yarn having a yarn count of 100 or more may be defined as the “thin cloth”.

Specific numeric settings of “thin cloth” and “high coverage” may be appropriately changed according to the configuration of the inkjet recording apparatus 1, an ink to be ejected, and the like. Furthermore, specific numerical settings of “thin cloth” and “high coverage” may be appropriately changeable by a user’s operation instruction. The conditions under which foreign matter is likely to adhere to the conveyance belt 33 may also be changed as appropriate, regardless of whether the recording medium P is thin cloth, borderless printing, or high-coverage printing.

Furthermore, it is sufficient that the conveyance belt 33 is conveyed such that, in the cleaning mode, the upstream end of the region 33*a* is cleaned at least by the cleaning member (the sprayer 52 in FIG. 1) at the downstream end of the cleaner 5. With this configuration, time required for the cleaning mode is shortened. In addition, the feed amount of the recording medium P decreases.

In the above description, a configuration in which the conveyance belt 33 is cleaned by continuously conveying and driving the conveyance belt 33 after the ink ejection of the head unit 4 is ended is exemplified, but the invention is not limited thereto. A configuration may be adopted in which the conveyance belt 33 is stopped at the same time as the end of the ink ejection of the head unit 4 to evacuate the recording medium P, and then the recording medium P is cleaned by the movable cleaner 5.

In the above description, an example is disclosed in which the ROM 103 is used as a computer-readable medium of the program according to the present invention, but the present invention is not limited to this example. As another computer-readable medium, a portable recording medium such as a CD-ROM can be applied. Furthermore, as a medium for providing data of the program according to the present invention via a communication line, a carrier wave is also applied.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-128611 filed on Aug. 7, 2023 is incorporated herein by reference in its entirety.

What is claimed is:

1. An inkjet recording apparatus, comprising:

a hardware processor that controls a conveyance operation of a conveyance member that conveys a recording medium;

a head unit that forms an image by ejecting an ink containing a binder resin onto the recording medium on the conveyance member; and a cleaner that cleans the conveyance member, wherein the hardware processor, when instructed to stop the conveyance operation of the conveyance member, determines whether an image formation is executed under a predetermined condition, executes a cleaning mode in which conveyance of the conveyance member is continued to cause the cleaner to clean the conveyance member when the image formation is executed under the predetermined condition, and stops conveyance of the conveyance member to provide an alert that there is a possibility that foreign matter is adhering to the conveyance member when the image formation is not executed under the predetermined condition.

2. The inkjet recording apparatus according to claim 1, wherein, in the cleaning mode, the hardware processor causes the conveyance member to be conveyed such that a region of the conveyance member located under a lower surface of the recording medium on which the image is formed is cleaned by the cleaner.

3. The inkjet recording apparatus according to claim 2, wherein in the cleaning mode, the hardware processor causes the conveyance member to be conveyed to the cleaner at least as far as an upstream end in a conveyance direction of the region.

4. The inkjet recording apparatus according to claim 3, wherein the cleaner includes a plurality of cleaning members, and in the cleaning mode, the hardware processor conveys the region until the region passes through at least one of the plurality of cleaning members.

5. The inkjet recording apparatus according to claim 1, wherein the hardware processor executes the cleaning mode when image formation under the predetermined condition is ended and the stop is instructed.

6. The inkjet recording apparatus according to claim 5, wherein the predetermined condition indicates that at least one of a case where the recording medium is a thin cloth, a case where borderless printing is performed, and a case where high-coverage printing is performed is satisfied.

7. The inkjet recording apparatus according to claim 5, wherein the predetermined condition is settable by a user.

8. The inkjet recording apparatus according to claim 1, wherein the hardware processor receives an error stop or an emergency stop instruction and the hardware processor provides the alert after cancellation of the error stop or the emergency stop of the conveyance member, and executes the cleaning mode in response to a user instruction.

9. The inkjet recording apparatus according to claim 1, further comprising:

a detector that is capable of detecting foreign matter on a placement surface of the conveyance member, wherein the hardware processor provides the alert when the detector has detected the foreign matter.

10. The inkjet recording apparatus according to claim 1, wherein the conveyance member is a conveyance belt.

11. The inkjet recording apparatus according to claim 10, wherein an adhesive is applied to a placement surface of the conveyance belt, the placement surface being a side on which a recording medium is placed.

12. The inkjet recording apparatus according to claim 1, wherein the conveyance member includes a plurality of conveyance rollers.

13. The inkjet recording apparatus according to claim 1, wherein the ink is a pigment ink.

14. The inkjet recording apparatus according to claim 1, wherein the binder resin is added in an amount of 5% by mass to 15% by mass relative to a total amount of the ink.

15. The inkjet recording apparatus according to claim 1, wherein the cleaner includes a brush roller.

16. A non-transitory computer readable recording medium storing a program to be run by a computer of an inkjet recording apparatus comprising: a head unit that forms an image by ejecting an ink containing a binder resin onto the recording medium on a conveyance member; and a cleaner that cleans the conveyance member, wherein the program causes the computer to control an operation of the conveyance member that conveys the recording medium, wherein the program, when instructed to stop a conveyance operation of the conveyance member, determines whether an image formation is executed under a predetermined condition, executes a cleaning mode in which conveyance of the conveyance member is continued to cause the cleaner to clean the conveyance member when the image formation is executed under the predetermined condition, and stops conveyance of the conveyance member to provide an alert that there is a possibility that foreign matter is adhering to the conveyance member when the image formation is not executed under the predetermined condition.

* * * * *